(12) United States Patent
Ejderklint

(10) Patent No.: US 6,799,925 B2
(45) Date of Patent: Oct. 5, 2004

(54) CUTTING INSERT FOR CHIP REMOVING MACHINING

(75) Inventor: Christer Ejderklint, Fagersta (SE)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 10/602,599

(22) Filed: Jun. 25, 2003

(65) Prior Publication Data

US 2004/0101374 A1 May 27, 2004

(30) Foreign Application Priority Data

Jun. 25, 2002 (SE) ................................. 0201975

(51) Int. Cl.[7] ............................................ B23B 27/22
(52) U.S. Cl. ....................... 407/116; 407/114; 407/115
(58) Field of Search ................................ 407/113–117

(56) References Cited

U.S. PATENT DOCUMENTS

| | | | | |
|---|---|---|---|---|
| 4,629,372 A | * | 12/1986 | Huston | 407/116 |
| 4,778,311 A | * | 10/1988 | Niemi | 407/116 |
| 5,076,739 A | * | 12/1991 | Pano | 407/116 |
| 5,365,805 A | | 11/1994 | Pantzar et al. | |
| 6,142,716 A | * | 11/2000 | Jordberg et al. | 407/114 |
| 6,186,705 B1 | * | 2/2001 | Kumar et al. | 407/114 |
| 6,200,077 B1 | | 3/2001 | Svenningsson et al. | |
| 6,244,790 B1 | | 6/2001 | Kingdom et al. | |
| 6,341,924 B1 | | 1/2002 | Tägtström et al. | |

FOREIGN PATENT DOCUMENTS

| | | |
|---|---|---|
| EP | 0 555 192 A1 | 1/1993 |
| EP | 0 985 476 A1 | 8/1999 |
| WO | 99/34947 A1 | 7/1999 |
| WO | 01/19557 A1 | 3/2001 |

* cited by examiner

Primary Examiner—Willmon Fridie, Jr.
(74) Attorney, Agent, or Firm—Burns, Doane, Swecker & Mathis, L.L.P.

(57) ABSTRACT

A directly pressed cutting insert for chip removing machining includes a top surface, a bottom support surface, and edge surfaces interconnecting the top and support surfaces. The top surface comprises a chip surface. A cutting corner is formed by the intersection of two of the edge surfaces and includes a first cutting edge. One of the two edge surfaces includes a first clearance surface having a first clearance angle. The first edge surface includes a second clearance surface having a second clearance angle, which is greater than the first clearance angle. Each of the first and second clearance surfaces connects to the same first cutting edge.

10 Claims, 4 Drawing Sheets

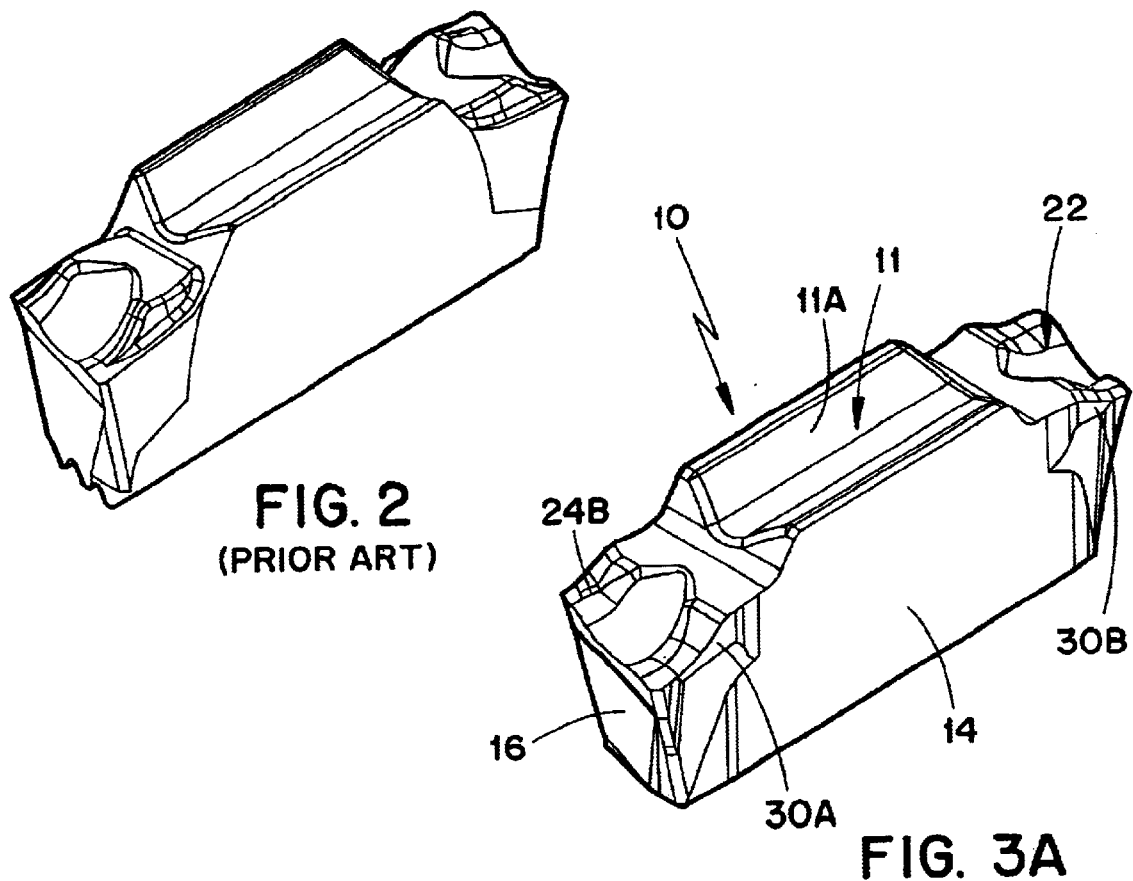
FIG. 2 (PRIOR ART)
FIG. 3A
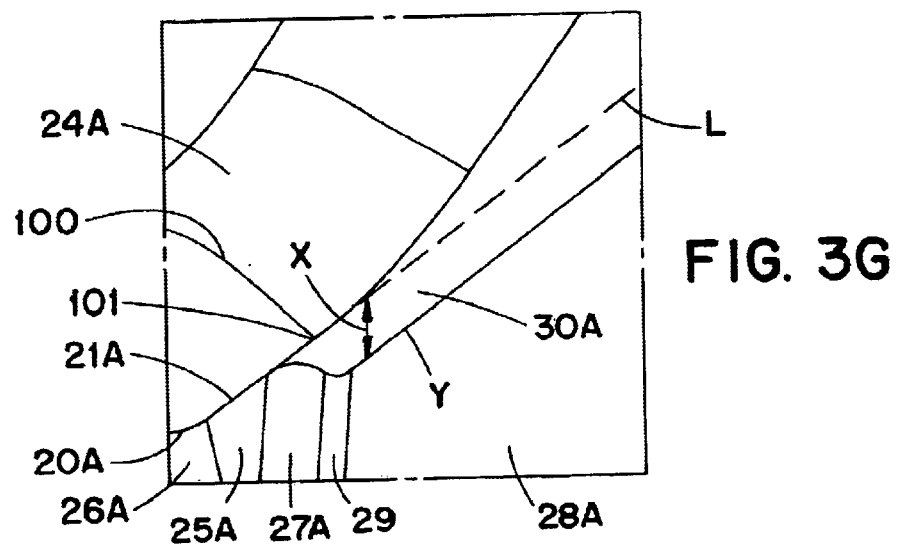
FIG. 3G

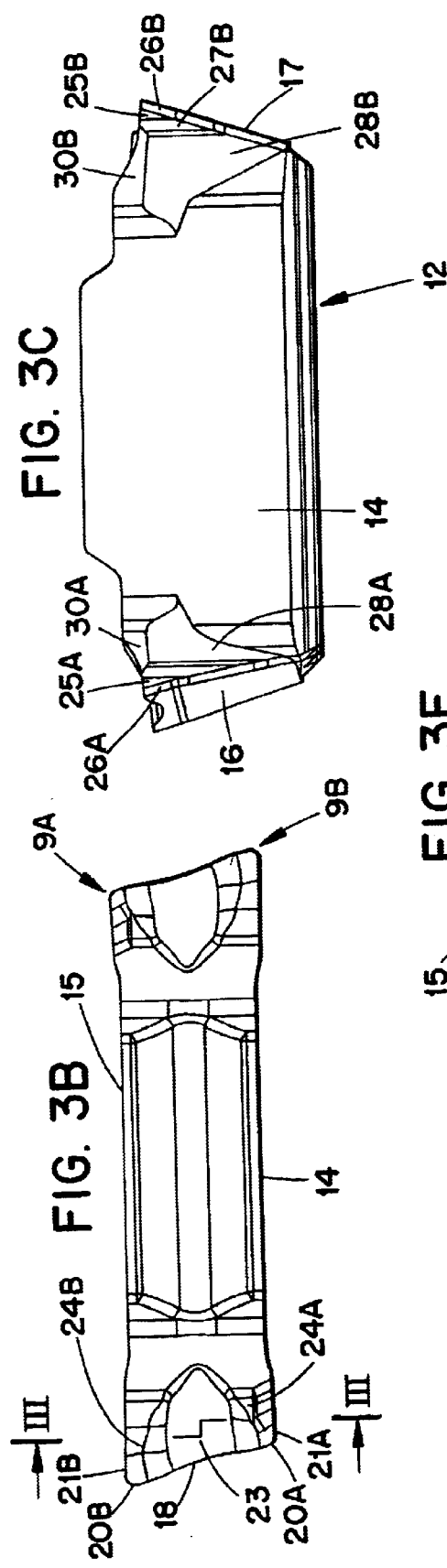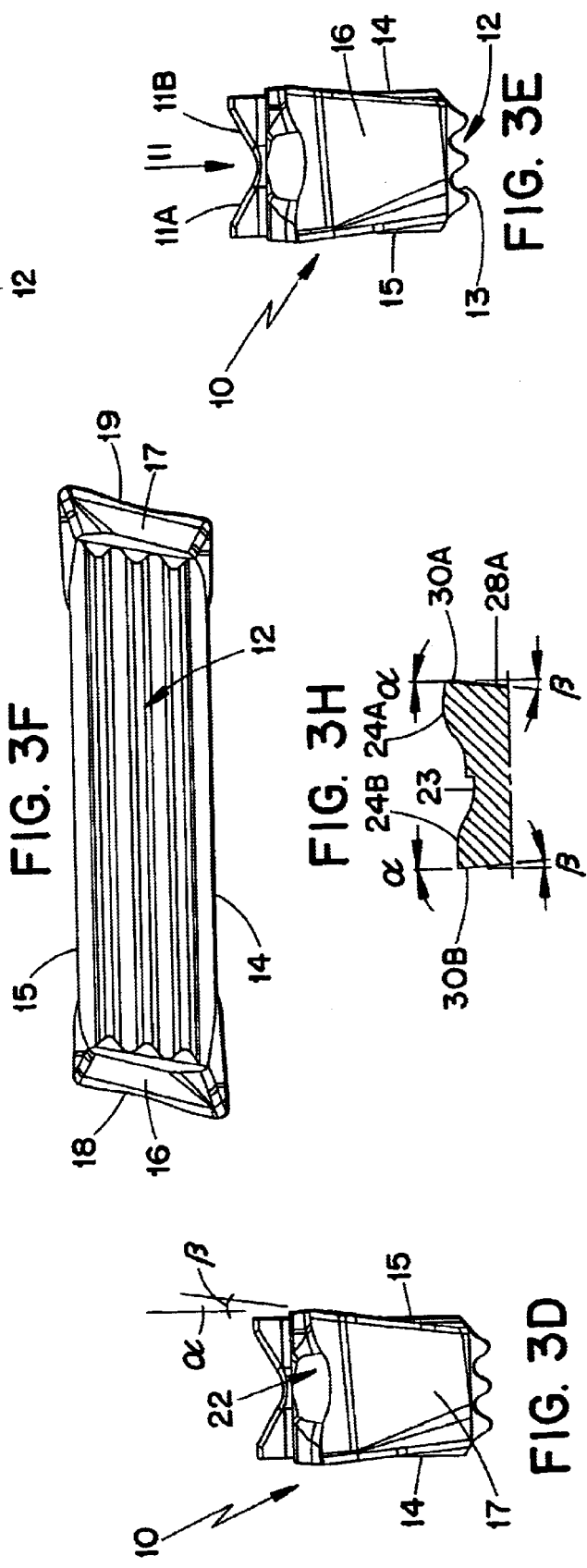

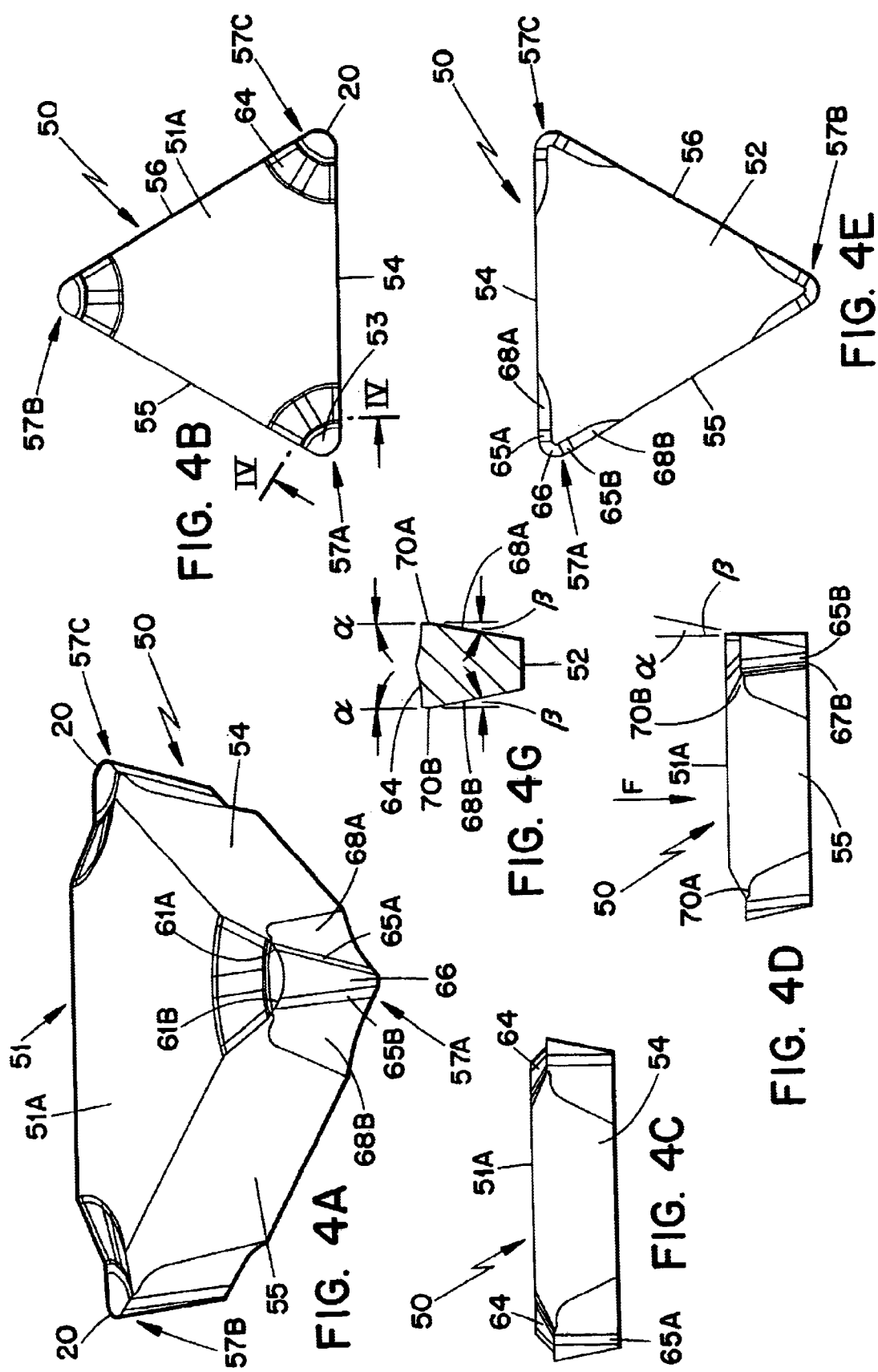

CUTTING INSERT FOR CHIP REMOVING MACHINING

This application claims priority under 35 U.S.C. §§119 and/or 365 to Patent Application Ser. No. 0201975-0 filed in Sweden on Jun. 25, 2002, the entire content of which is hereby incorporated by reference.

BACKGROUND OF THE INVENTION

The present invention relates to a directly pressed cutting insert for chip removing machining.

The most common hard material in cemented carbide is tungsten carbide, WC. Numerous hard metal grades contain only WC and binder metal. In others, carbides of the metals titan (TiC), tantalum (TaC) and niobium (NbC) are also included. The most common binder metal is cobalt, Co, but also nickel, Ni, occurs. The cemented carbide is a powder mixture built up by carbide particles having a grain size 0.5–10 μm and a binder metal, generally cobalt. The percentage by volume is 5–40% for the binder metal, and 95–60% for the carbides. The manufacture of cemented carbide products can be divided into the steps of:— manufacturing of cemented carbide powder, —pressing, —sintering, —finishing and —possibly coating. At the pressing, the cemented carbide powder is pressed to a solid and thereby obtains its shape. However, it does not obtain the correct dimensions until the subsequent sintering. The pressed bodies of cemented carbide powder have a low strength, approximately the same as chalk. In order to obtain the desired properties, hardness, wear resistance, etc., the material has to be sintered. During the sintering, the length, width and height dimensions of the cemented carbide body decrease. Different hard metal grades have different shrinkage. Today, most indexable inserts are directly pressed to complicated shapes, which are to provide good clamping possibilities, as well as good chip breaking or chip forming.

Today, the known pressing technique includes: (1) a negative die, which produces a blank without clearance (see FIG. 1), (2) a positive die, which produces a blank with clearance and planar surface of uniform width at the edge, and which demands after-treatment by means of grinding, and (3) a positive shearing tool, which produces a blank with clearance and a sharp edge. By "shear", is meant a nominal gap of about 10 micrometer between pressing parts. The drawbacks of the known techniques are that the freedom of choice regarding geometries is limited and that each blank shape is predetermined by the respective pressing tool.

OBJECTS OF THE INVENTION

One object of the present invention is to provide a directly pressed cutting insert.

Another object of the present invention is to provide a cutting insert having a varying planar surface.

An additional object of the present invention is to provide a cutting insert that may be directly pressed with great freedom of choice regarding the geometry of the cutting body and the chip breaker in the pressing tool.

SUMMARY OF THE INVENTION

The invention relates to a directly pressed cutting insert for chip removing machining which is formed by a pressing force acting in a pressing direction. The insert comprises a top surface, a bottom surface, and edge surfaces interconnecting the top and support surfaces. The top surface comprises a rake face, wherein a cutting corner is formed in an area of an intersection of two of the edge surfaces. The cutting corner comprises a first cutting edge. One of the two edge surfaces comprises a first clearance surface having a first clearance angle and a second clearance surface having a second clearance angle which is greater than the first clearance angle. Both of the first and second clearance surfaces connect to the same first cutting edge. The cutting insert has a negative basic shape, wherein a major part of at least some of the edge surfaces is parallel to the pressing direction.

BRIEF DESCRIPTION OF THE DRAWINGS

The objects and advantages of the invention will become apparent from the following detailed description of a preferred embodiment thereof in connection with the accompanying drawing in which like numerals designate like elements.

FIG. 2 shows a conventional cutting insert in perspective view.

FIG. 3A shows a cutting insert according to the present invention in perspective view.

FIG. 3B shows the cutting insert according to the present invention in top view.

FIG. 3C shows the cutting insert according to the present invention in side view.

FIG. 3D shows the cutting insert according to the present invention in bottom view.

FIGS. 3E and 3F show the cutting insert according to the present invention in opposite end views.

FIG. 3G shows a detail from FIG. 3A.

FIG. 3H shows a cross-section according to the line III—III in FIG. 3B.

FIG. 4A shows an alternative embodiment of a cutting insert according to the present invention in a perspective view.

FIG. 4B shows the cutting insert according to the present invention in top view.

FIGS. 4C and 4D show the cutting insert according to the present invention in side views.

FIG. 4E shows the cutting insert according to the present invention in bottom view.

FIG. 4G shows a cross-section according to the line IV—IV in FIG. 4B.

DESCRIPTION OF PREFERRED EMBODIMENTS OF THE INVENTION

Figure 1:
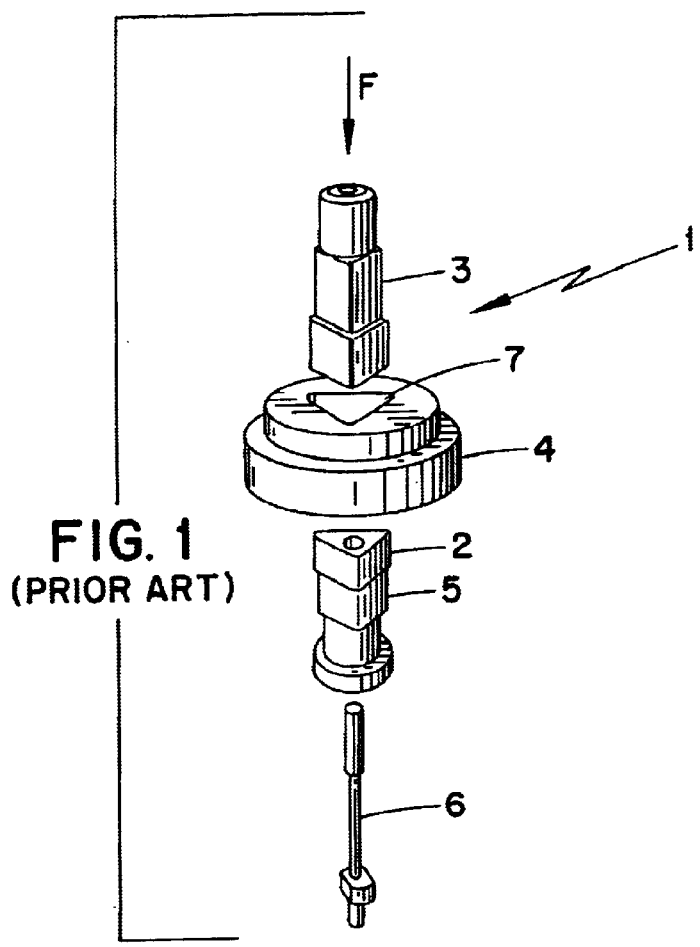
FIG. 1 shows a conventional pressing tool and a conventional blank in an exploded view.
Figure 4F:
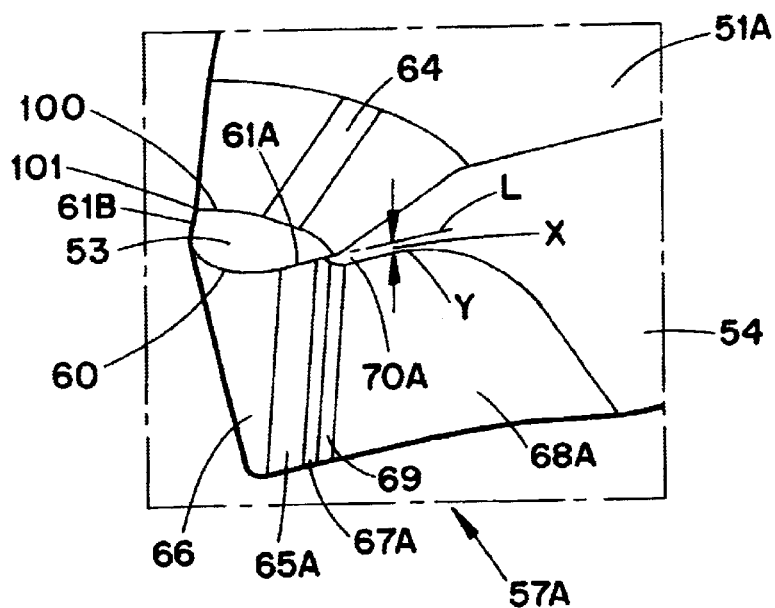
FIG. 4F shows an enlarged detail from FIG. 4A.

In FIG. 1, a conventional pressing tool 1 and a conventional negative blank 2 produced thereby are shown. The pressing tool 1 comprises an upper punch 3, a die 4, a lower punch 5, and in occurring cases a plunger 6. The cavity 7 of the die 4 is intended to be filled with powder, which is compressed between the upper punch 3 and the lower punch 5 so that a blank 2 having a chalk-like consistency is formed. The die thereby forms the edge geometry of the blank 2, while the upper punch forms the geometry of the top side and the lower punch forms the geometry of the bottom side. The intention of a plunger 6 is to provide a central hole in the blank. The pressing tool 1 has a negative die 4, which may produce only blanks without clearance, i.e. the edge surfaces of the blank become parallel to the relative direction of motion F of the upper punch 3 during pressing.

If the die 4 is replaced by a positive die, the blank obtains clearance, i.e. the edge surfaces converge at least partly in the direction of motion F of the upper punch, as is seen in FIG. 2. The cutting insert is described in U.S. Pat. No. 4,778,311 regarding the chip forming properties thereof as well as in U.S. Pat. No. 6,244,790 regarding the support surfaces. The known cutting insert comprises ground cutting edges at each end area.

Reference being made to FIGS. 3A–3H, a cutting insert 10 according to the present invention is shown. The cutting insert is single-sided and intended for slot turning or groove turning. The cutting insert is intended to be fastened in a holder of the type where a clamping arm comprises a top side of a cutting insert seating. The arm is movable by means of a screw or via integrated spring force. The top side 11 of the cutting insert is of a general V-shape with flanks 11A, 11B converging inwards towards the cutting insert. The flanks make an obtuse, inner angle with each other, which is within the interval 120° to 160°. The clamping arm is intended to clamp the support surface 12 of the cutting insert down against the lower side of the cutting insert seating. The support surface is formed with a number of identical grooves 13, separated from each other, which in cross-section provide a substantially curve-shaped path (see FIG. 3E). Each groove 13 is elongate and has an extension along the entire support surface 12 along a line, wherein said line substantially coincides e.g. with the bottom of the groove. Said line is substantially perpendicular to the direction of motion F of the upper punch.

The cutting insert 10 comprises edge surfaces 14, 15, 16, 17 connecting the top side to the support surface. Intersecting lines between the edge surfaces 16, 17 and the top side 11 form cutting edges 18, 19. The cutting edges are somewhat wider than the support surface, and the length between the cutting edges is greater than the length of the support surface for the sake of clearance. The length of the cutting edge 18, 19 is shorter than the height of the cutting insert between the top side and the support surface.

The chip forming end areas of the cutting insert 10 are in this case identical, and therefore only one end area is described hereinafter. The ends of the cutting edge 18 connect to minor cutting edges 21A, 21B via rounded portions or nose edges 20A, 20B. Each nose edge may be defined by means of one or more radii. The cutting edges 18, 21A, 21B connect to a rake face 22 arranged in the top side 11 of the cutting insert. The rake face 22 comprises a central recess 23, which connects to the cutting edge in order to form an indentation in the latter. The area for the respective rounded portions 20A, 20B comprises a portion or arm 24A, 24B, elevated in relation to the recess 23. The arm 24A, 24B rises substantially upwards from a line 100 or a point 101 in direction towards the second end area of the cutting insert. The arms 24A, 24B converge behind the recess above the level of the cutting edge 18, and constitute a chip breaker.

Under each cutting edge, there is a clearance surface and, as may be seen in FIGS. 3C and 3G, the numbers 25A, 25B designate the clearance surfaces of the minor cutting edges 21A, 21B. One of the sides of the clearance surface 25A connects to the clearance surface 26A of the nose edge 20A, and the other side thereof connects to a concave portion 27A. The concave portion 27A connects to an additional clearance surface 28A, via a convex portion 29. Each of the said surfaces and portions form an acute angle to the direction of motion F of the upper punch (FIG. 1).

A straight part or planar surface 30A is arranged adjacent to, in this case above, the concave portion 27A, the clearance surface 28A and the convex portion 29. The planar surface 30A broadens gradually in the direction of thickness of the cutting insert from substantially a line adjacent to the minor cutting edge 21A, 21B along a substantially S-shaped curve or along a substantially inverted S-shaped curve. This means that the upper limiting line of the concave portion 27A only partly reaches an extension line L of the minor cutting edge 21A. The line L diverges outwardly in the longitudinal direction of the cutting insert in relation to the adjacent edge surface 14 (see FIG. 3B) in order to obtain clearance for the surface 14. The climb of the arms 24A, 24B is varied in one and the same insert-forming die by only exchanging the upper punch before the direct pressing and, in this way a directly pressed cutting insert can be obtained that needs no grinding. The relationship between the surfaces 25A, 26A, 27A, 29 and 30A is the same as that of the surfaces 25B, 26B, 27B, 29 and 30B on the other arm 24B.

In FIGS. 4A–4F, an alternative embodiment of a directly pressed cutting insert 50 according to the invention is shown. The cutting insert 50 is single-sided and has a triangular basic shape. The cutting insert may alternatively have a different polygonal shape, such as trigon-shaped, rectangular, rhombic, hexagonal or octagonal. The cutting insert is intended for fine longitudinal turning. The top side 51 of the cutting insert comprises a substantially planar surface 51A, which is parallel to the support surface 52 of the cutting insert. Said surface 51A, 52 are substantially perpendicular to the direction of motion F of the upper punch. The cutting insert 50 comprises edge surfaces 54, 55, 56 connecting the top side 51 to the support surface 52. The cutting insert comprises cutting corners or corner portions 57A, 57B, 57C, which are countersunk in relation to the top side 51. The cutting corners of the cutting insert 50 are in this case identical, and therefore only one cutting corner portion 57A is described hereinafter. Intersecting lines at the corner portion 57A between a rake face 53 and respective clearance surfaces 65A, 65B, 66 form cutting edges 60, 61A, 61B. The cutting edge 60 consists of a rounded portion in the form of a nose edge. The nose edge may be defined by means of one or more radii. The ends of the nose edge connect to respective short straight cutting edges 61A, 61B. The total length of the cutting edges 60, 61A, 61B is preferably shorter than the height of the cutting insert between the top side and the support surface.

The rake face 53 is substantially planar but may alternatively comprise one or more recesses or projections. The area disposed inwardly of the cutting edges 61A, 61B comprises a portion 64, elevated in relation to the rake face 53 (see FIG. 4F). The portion 64 is substantially part-conically formed and does in certain cases constitute a chip breaker. The portion 64 rises substantially upwards from a line 100 or a point 101 in direction towards the central area of the cutting insert. The portion 64 has a height above the rake face that is between 10–50% of the thickness of the cutting insert.

Below each cutting edge 61A, 61B, there is a clearance surface 65A, 65B. One side of the clearance surface 65A connects to the clearance surface 66 of the nose edge 60 and the other side thereof connects to a concave portion 67A, 67B. The concave portion connects to an additional clearance surface 68A, 68B via a convex portion 69. Each of said surfaces and portions forms an acute angle to the direction of motion F of the upper punch.

A planar surface 70A, 70B, which is a coplanar part of the edge surface 54, is arranged adjacent, in this case above, the concave portion 67A, the clearance surface 68A and the convex portion 69. The planar surface 70A broadens gradually from substantially a line adjacent to the cutting edge 61A, 61B along a substantially S-shaped curve or along a substantially inverted S-shaped curve. This means that the upper limiting line of the concave portion 67A, 67B only partly reaches an extension line L of the cutting edge 61A, 61B. The line L coincides with the adjacent edge surface 54 of the cutting insert. The line L is perpendicular to the direction of motion F of the upper punch. Thereby, the climb of the chip breaker 64 may be varied in one and the same die by merely exchanging the upper punch and in that way obtain a directly pressed sharp cutting insert that does not need to be ground. The negative cutting insert 50 partially lacks clearance but has portions, for instance at the cutting corners, having a greater clearance and fits, at the same time, in the same tool holders as known negative cutting inserts.

Common for cutting inserts according to the present invention is at least the following. The cutting insert 10; 50 is directly pressed and comprises a top surface 11, 51, a support surface 12; 52, as well as edge surfaces 14–17; 54–56 connecting the same. The top surface comprises a rake face 24A, 24B; 53. A cutting corner 9A, 9B; 57A–57C is formed in the area of the intersection of two edge surfaces comprising a first cutting edge 21A; 61A. A first of said edge surfaces comprises a first clearance surface 30A; 70A having a first clearance angle α. The first edge surface comprises a second clearance surface 25A; 65A having a second clearance angle β, which is greater than the first clearance angle α. Each of the first and second clearance surfaces 30A, 25A (or 70A, 65A) connects to one and the same first cutting edge 21A; (or 61A). The first clearance surface 30A; 70A is parallel to the pressing direction F of the cutting insert, which means that the angle α is 0 degrees. The first clearance surface 30A; 70A has an extension to a point on a sharp first cutting edge 21A; 61A. The first clearance surface 30A; 70A connects to a chip breaker 24A; 64. A lower limiting line Y of the first clearance surface 30A; 70A is arranged at a distance X from the chip breaker 24A; 64, wherein said distance X substantially increases from a cutting corner in the direction towards an adjacent cutting corner. The first cutting edge 21A; 61A connects to a second cutting edge 20A; 60, wherein the second cutting edge is convex. The first cutting edge 21A; 61A is straight. A major part of at least some of the edge surfaces 14, 15, 54, 55, 56 are parallel to the pressing direction F of the cutting insert.

The invention may be applied to all types of directly pressed chip removing cutting inserts. The cutting inserts are preferably coated with layers of e.g. $Al_2O_3$, TiN and/or TiCN.

It is understood that the geometries of the cutting inserts may be varied within the scope of the present invention without deviating from the general idea of the invention. The cutting insert is a directly pressed cutting insert produced without subsequent grinding. The cutting insert has a gradually increasing and controlled planar surface of varying width, which begins at a point along a sharp cutting edge. This is obtained by new design of the die of the pressing tool. The planar surface may vary in width or exist along a limited distance of the edge, possibly in order to imitate initial phase wear. This may of course be repeated along the circumference of the cutting insert with a plurality of sections of sharp edge and planar surface. The planar surface may vary in width from near zero to equal to the entire thickness of the cutting insert.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. Directly pressed cutting insert for chip removing machining formed by a pressing force acting in a pressing direction, the insert comprising a top surface, a bottom support surface, and edge surfaces interconnecting the top and support surfaces; said top surface comprising a rake face; a cutting corner being formed in an area of an intersection of two of the edge surfaces; the cutting corner comprising a first cutting edge; one of said edge surfaces comprising a first clearance surface having a first clearance angle, and a second clearance surface having a second clearance angle greater than the first clearance angle; both of the first and second clearance surfaces connecting to the same first cutting edge; the cutting insert having a negative basic shape, wherein a major part of at least some of the edge surfaces is parallel to the pressing direction.

2. Cutting insert according to claim 1 wherein the first clearance surface is parallel to the pressing direction.

3. Cutting insert according to claim 1 wherein the first clearance surface has an extension to a point on the first cutting edge.

4. Cutting insert according to claim 1 wherein the first clearance surface connects to a chip breaker surface.

5. Cutting insert according to claim 4, wherein a lower limiting line of the first clearance surface is arranged at a distance from the chip breaker, said distance substantially increasing from a chip forming end area in the direction of an adjacent chip forming end area.

6. Cutting insert according to claim 1 wherein the first cutting edge connects to a convex second cutting edge on the cutting corner.

7. Cutting insert according to claim 1 wherein the first cutting edge is straight.

8. Cutting insert according to any claim 1 wherein the cutting insert comprises a groove-turning cutting insert or slot turning cutting insert.

9. Cutting insert according to claim 1 wherein the cutting insert comprises a triangular cutting insert.

10. Cutting insert according to claim 1 wherein the first clearance surface is parallel to the pressing direction and has an extension to a point on the first cutting edge, the first clearance surface connecting to a chip breaker surface, a lower limiting line of the first clearance surface arranged at a distance from the chip breaker, said distance substantially increasing from a chip forming end area in the direction of an adjacent chip forming end area, the first cutting edge connecting a convex second cutting edge on the cutting corner.

* * * * *